Figures 1, 2, 3, 4:
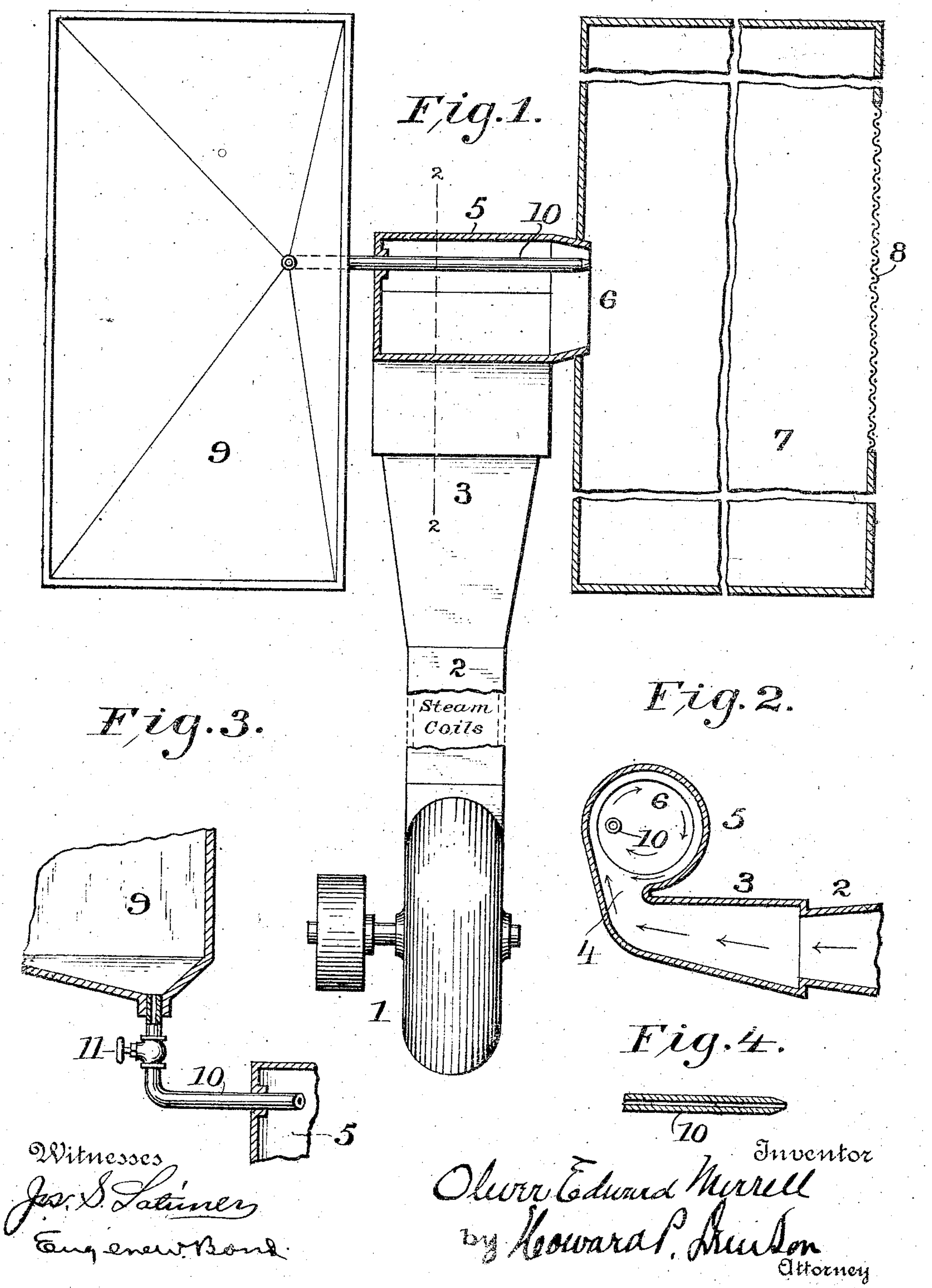

O. E. MERRELL.

DESICCATING APPARATUS.

APPLICATION FILED MAR. 29, 1910.

1,072,391. Patented Sept. 2, 1913.

Witnesses
Jas. S. Latimer
Eugene W. Bond

Inventor
Oliver Edward Merrell
by Howard P. Denison
Attorney

UNITED STATES PATENT OFFICE.

OLIVER EDWARD MERRELL, OF SYRACUSE, NEW YORK.

DESICCATING APPARATUS.

1,072,391. Specification of Letters Patent. Patented Sept. 2, 1913.

Application filed March 29, 1910. Serial No. 552,223.

*To all whom it may concern:*

Be it known that I, OLIVER EDWARD MERRELL, of Syracuse, in the county of Onondaga, in the State of New York, have invented new and useful Improvements in Desiccating Apparatus, of which the following, taken in connection with the accompanying drawings, is a full, clear, and exact description.

This invention relates to an apparatus for obtaining the solids from organic liquids, in the form of a substantially dry powder, which may be returned again to its original liquid form by the addition of a suitable amount of water, without the loss of the distinguishing characteristics of the original liquid.

The invention is especially applicable to and intended for the drying of organic liquids having a high moisture-content, such as milk, and eggs. If milk is treated, it may be in its original condition, or the cream may be first removed; and, in either case, the milk (whole or skimmed) may be condensed or concentrated before subjecting it to the desiccating operation. Cream may also be dried to a powder by the new process.

The organic liquid is subjected to the intimate action of a whirling current of moisture-absorbing air, sufficient in quantity to take up and carry off the moisture-content of the liquid, the spirally forward motion imparted to the air current causing the air to disintegrate the liquid and break it up into excessively fine particles in the nature of a cloud or mist, with the result that the moisture is removed from the solids and absorbed by the air in a practically instantaneous manner, leaving the dry solids to collect separately from the moisture-laden air current.

Suitable apparatus for carrying out the new process is illustrated in the accompanying drawings, wherein—

Figure 1, is a top plan of the apparatus partly in section. Fig. 2, is a vertical section on line 2—2, Fig. 1. Fig. 3, is a detail section. Fig. 4, is a detail section of the discharge end of the liquid supply pipe.

1, is an ordinary pressure blower, fan, or other means for forcing air through a conduit 2, which is preferably flattened at 3, as it approaches the tangential entrance 4, to a cylinder or air whirling chamber 5. One end of the air whirling chamber 5, is contracted and opens at 6, and enters the desiccating chamber 7, said desiccating chamber having a suitable screened air outlet, as by having upon one side a screen 8, of fine bolting cloth, or similar material, through which the air and vapor pass off while the solids gravitate to the floor, where they may be removed in any convenient way.

The organic liquid to be desiccated is contained in a receptacle 9, preferably raised slightly above the supply-pipe 10, so that the liquid may flow through said supply-pipe by gravity, and may flow out in a stream or in drops. The supply-pipe is provided with an ordinary control valve 11. The discharge end of pipe 10, is beveled to a sharp edge as shown in Fig. 4. The supply-pipe 10 passes into the air whirling chamber 5, at any convenient point and several pipes may be used, conditioned upon the quantity and the moisture absorbing properties of the air used, but the open end of the supply-pipe 10, should coterminate substantially with the open end of the chamber 5, and preferably placed eccentrically thereto. The air is passed through the conduit 2, into the chamber 5, at a pressure of a few ounces to the square inch. In passing from the blower to the air whirling chamber the air passes around heating surfaces, such as coils of steam pipes, which are not shown. The air enters the air whirling chamber tangentially and takes a spiral or whirling path, as indicated, and finally emerges through the contracted open end 6, of the air whirling chamber into the desiccating chamber, where it continues its whirling motion transversely to the path of the inflowing stream of liquid, thereby disintegrating or breaking up the liquid into fine particles as it emerges from the open end of the pipe 10, and converting it into a mist and simultaneously absorbing the moisture, the separated solids gravitating to the bottom of the desiccating chamber, and the air and vapor passing out through the fine screen 9, or other suitable screened collector.

There is a tendency to produce a back flow of air in the central portion of the open end of the air whirling chamber. If the end of the supply-pipe terminated in this central portion, the emerging liquid would be drawn backward somewhat, and toward the periphery of the air whirling chamber before being whirled into the desiccating chamber by the spiral current of air, so that some of the liquid might collect on the walls of the air whirling chamber. To avoid this, the discharge end of the supply-pipe 10, is eccentric to the open end of the chamber 5, and near the periphery of the outlet opening 6, so that the rapid current of air more effectively engages with and breaks up the liquid, as it emerges from the end of the supply-pipe, thereby whirling it into the desiccating chamber and causing disintegration and desiccation. It will be understood, however, that the process may be operated by locating the supply-pipe centrally to the outlet 6, though the maximum disintegrating effect is produced as aforesaid, by locating the end of the supply-pipe near the periphery of said outlet.

The size of the chamber 5, and the pressure and quantity of air passing through it, and the moisture-absorbing condition of such air, are so regulated as to furnish a sufficient quantity of air to thoroughly remove the moisture from the liquid passing through the supply the. Air which has been heated or subjected to special treatment to render its moisture-absorbing may be used, but ordinary atmospheric air is efficient to carry out the process.

In order that the process may be fully understood, the details of one practical installation will be given. A pressure blower is employed having a blower discharge five and one-fourth (5.25) inches in internal diameter, and the blower speed is three thousand nine hundred (3,900) revolutions a minute. This requires about one and one-half (1.5) horse power. A pressure of seven (7) ounces per square inch is produced, and air is delivered at the rate of about six hundred and fifty cubic (650) feet per minute. The air is passed over steam coils in which there is a steam pressure of ninety to one hundred (90 to 100) pounds per square inch, and the average temperature within the desiccating chamber is one hundred and sixty-four (164) degrees Fahrenheit.

The internal diameter of the air whirling chamber 5, is six (6) inches, and the internal length of the cylindrical part is nine (9) inches. The intake 4, to the chamber 5, is two (2) inches across and of the length of the cylindrical part of said chamber. The diameter of the outlet opening 6, is five (5) inches. The supply-pipe 10, has an internal diameter of one thirty-second (.03125) of an inch, and the head is such that it delivers twenty-two (22) pounds of milk or other organic liquids in an hour. The desiccating chamber is six (6) feet high, is nine (9) feet long from the air outlet 6, to the opposite wall, and is six (6) feet wide. These details are subject to variation depending upon practical conditions, such as the initial dryness of the air, the amount of moisture in the milk or other organic liquid, the quantity to be treated, and the pressure in the steam coils.

The quantity of air is large in proportion to the liquid treated, and its disintegrating capacity is due to its rotation under pressure and at high velocity. In this connection the contraction of the outlet 6, is important since it retards the escape of the air into the desiccating chamber, and hence contributes to the desired whirling motion.

The whirling motion of the air not only disintegrates the liquid and subjects it to a large volume of air, but also prolongs the contact between the air and the liquid, delaying the effect of gravity so that complete drying takes place. As the result a relatively small drying chamber can be used.

The invention is not limited to an apparatus in which the inflowing stream of liquid is constant for it may be carried out in a satisfactory manner by allowing the liquid to emerge from the end of the supply-pipe intermittently, as in drops or jets.

The invention consists in a new apparatus, whereby organic liquids of high moisture-content may be disintegrated and desiccated solely by the agency of a spiral or whirling current of air.

I claim:—

1. The combination of a desiccating chamber having a screened outlet, an air-whirling chamber opening into said desiccating chamber through a contracted outlet, means for forcing air through said air-whirling chamber into said disiccating chamber, and a liquid supply-pipe having its outlet at the opening between said chambers and near the edge of said opening.

2. The combination of a desiccating chamber, an air-whirling chamber opening into said desiccating chamber, means for forcing air through said air-whirling chamber into said desiccating chamber, and a liquid supply-pipe having its outlet at the opening between said chambers and near the edge of said opening.

3. The combination of a desiccating chamber, an air-whirling chamber opening into said desiccating chamber through a contracted outlet, means for forcing air through said air-whirling chamber into said desiccating chamber, and a liquid supply-pipe having its outlet at the opening between said chambers.

4. The combination of a desiccating chamber, an air-whirling chamber opening into said desiccating chamber, means for forcing air through said air-whirling chamber into said desiccating chamber, and a liquid supply-pipe having its outlet at the opening between said chambers.

5. The combination of a desiccating chamber, an air-whirling chamber opening into said desiccating chamber, means for forcing air through said air-whirling chamber into said desiccating chamber, and a liquid supply-pipe discharging liquid into the whirling air.

In witness whereof I have hereunto set my hand on this 25th day of March 1910.

OLIVER EDWARD MERRELL.

Witnesses:

H. E. CHASE,

HOWARD P. DENISON